US007663345B2

(12) United States Patent
Ozawa et al.

(10) Patent No.: US 7,663,345 B2
(45) Date of Patent: Feb. 16, 2010

(54) CIRCUIT AND METHOD FOR CONTROLLING DC-DC CONVERTER

(75) Inventors: Hidekiyo Ozawa, Kasugai (JP); Takashi Matsumoto, Kasugai (JP); Takahiro Yoshino, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 371 days.

(21) Appl. No.: 11/512,318

(22) Filed: Aug. 30, 2006

(65) Prior Publication Data

US 2007/0216378 A1    Sep. 20, 2007

(30) Foreign Application Priority Data

Mar. 20, 2006    (JP) ............................. 2006-075910

(51) Int. Cl.
*H02J 7/04* (2006.01)
*H02J 7/16* (2006.01)

(52) U.S. Cl. ................... 320/140; 320/134; 320/163; 320/164; 307/59; 307/66

(58) Field of Classification Search ............... 320/140, 320/145, 128, 134, 162, 163, 164; 307/59, 307/66
See application file for complete search history.

(56) References Cited

U.S. PATENT DOCUMENTS 6,194,875 B1 *   2/2001   Takimoto et al. ............ 320/164
6,337,563 B2 *   1/2002   Takimoto et al. ............ 323/284
6,977,448 B2    12/2005   Kanouda et al.
6,997,448 B2 *   2/2006   Roth et al. .................. 269/309
7,157,810 B2 *   1/2007   Kanouda et al. .............. 307/66
2003/0184937 A1* 10/2003  Kanouda et al. .............. 361/90

FOREIGN PATENT DOCUMENTS

| JP | 08-182219    | 7/1996  |
|----|--------------|---------|
| JP | 2000-029544  | 1/2000  |
| JP | 2002369407   | 12/2002 |
| KR | 20000028826  | 5/2000  |
| KR | 14-369407    | 12/2002 |

* cited by examiner

*Primary Examiner*—Edward Tso
*Assistant Examiner*—Ramy Ramadan
(74) *Attorney, Agent, or Firm*—Arent Fox LLP

(57) ABSTRACT

A DC-DC converter for generating a stable output voltage and being applicable to a transient load fluctuation. The DC-DC converter detects an input current, and compares the input current with a rated current of an external power supply. The DC-DC converter controls a positive charging current that is supplied to a secondary battery in accordance with a consumption current of a load so that the input current does not exceed the rated current. The DC-DC converter further controls a negative charging current that is supplied from the secondary battery to the load when the load requires an input current exceeding the rated current.

26 Claims, 6 Drawing Sheets

US 7,663,345 B2

CIRCUIT AND METHOD FOR CONTROLLING DC-DC CONVERTER

CROSS-REFERENCE TO RELATED APPLICATIONS

This application is based upon and claims the benefit of priority from the prior Japanese Patent Application No. 2006-075910, filed on Mar. 20, 2006, the entire contents of which are incorporated herein by reference.

BACKGROUND OF THE INVENTION

The present invention relates to a DC-DC converter, and more particularly, to a circuit and method for controlling a DC-DC converter.

In recent years, an electronic device, such as a portable device or a peripheral device (e.g., a hard disk drive (HDD)) connected to a personal computer or a notebook personal computer generally includes a rechargeable secondary battery, which is used as a drive power supply, and a circuit for charging the secondary battery. The electronic device is connected to an external power supply of an AC adaptor or a personal computer to charge the secondary battery with current supplied from the external power supply when the electronic device is not operating. Further, when the consumption current of the electronic device is lower than the current supplied from the external power supply (rated current) during operation, the electronic device charges the secondary battery by supplying the secondary battery with charging current, which is less than the rated current. However, the consumption current of the electronic device may temporarily exceed the rated current of the external power supply depending on the operation state of the electronic device. When the consumption current of the electronic device exceeds the rated current of the external power supply, the operation of the electronic device may become unstable. Thus, the electronic device is required to operate in a stable manner even when its consumption current exceeds the rated current of the external power supply.

Japanese Laid-Open Patent Publication No. 8-182219 describes an electronic device including a charging circuit. The charging circuit charges a secondary battery with power supplied from an external power supply.

FIG. 1 is a schematic circuit diagram of a prior art charging circuit 10.

The charging circuit 10 is formed by a DC-DC converter. The charging circuit 10 lowers an input voltage Vin, which is supplied via, for example, a universal serial bus (USB) interface of a personal computer to generate first output voltage Vout1. The first output voltage Vout1 is supplied to a secondary battery BAT. The charging circuit 10 also generates second output voltage Vout2 from the input voltage Vin. The second output voltage Vout2 is supplied to a load (not shown), such as an internal circuit. A current measuring resistor RS1 is arranged in the path for supplying the second output voltage Vout2. The charging circuit 10 controls the amount of current supplied to the secondary battery based on the current flowing through the resistor RS1.

The charging circuit 10 includes a control circuit 11, transistors FET1 and FET2, a choke coil L1, a smoothing capacitor C1, current measuring resistors RS1 and RS2 (hereafter referred to as the first resistor RS1 and the second resistor RS2), and a diode D1. The control circuit 11 includes a first voltage amplifier AMP1 having two input terminals, which are respectively connected to the two terminals of the first resistor RS1 and which receives signals CS1 and FB1 indicating the potentials at the two terminals of the first resistor RS1. The first voltage amplifier AMP1 detects a potential difference between the two terminals of the first resistor RS1, that is, the potential that is in accordance with the current flowing through the first resistor RS1. The control circuit 11 further includes a second voltage amplifier AMP2 having two input terminals, which are respectively connected to the two terminals of the second resistor RS2 and which receives signals CS2 and FB2 indicating the potentials at the two terminals of the second resistor RS2. The second voltage amplifier AMP2 detects the potential difference between the two terminals of the second resistor RS2, that is, the potential that is in accordance with the current flowing through the second resistor RS2. The resistors R1 and R2 generate a divided voltage by dividing the voltage of the signal FB2, or the output voltage Vout1.

A first error amplifier ERA1 generates a first error signal Vop1 by amplifying the difference between the output voltage of the first voltage amplifier AMP1 and the voltage of a reference power supply e1. A second error amplifier ERA2 generates a second error signal Vop2 by amplifying the difference between the output voltage of the second voltage amplifier AMP2 and the voltage of a reference power supply e2. A third error amplifier ERA3 generates a third error signal Vop3 by amplifying the difference between the divided voltage and the voltage of a reference power supply e3.

A pulse-width modulation (PWM) comparator 100 compares a triangular wave signal generated by an oscillator OSC with the first to third error signals Vop1, Vop2, and Vop3 to generate complementary first and second control signals DH and DL, each having a pulse width that is in accordance with the comparison result. In detail, the PWM comparator 100 are has non-inversion input terminals supplied with the first to third error signals Vop1, Vop2, and Vop3 and an inversion input terminal provided with the triangular wave signal. The PWM comparator 100 compares the one of the first to third error signals Vop1, Vop2, and Vop3 having the lowest voltage with the triangular wave signal. The PWM comparator 100 then generates a high (H) level first control signal DH when the voltage of the triangular wave signal is higher than the voltage of the error signal and generates a low (L) level first control signal DH when the voltage of the error signal is lower than the voltage of the triangular wave signal. The PWM comparator 100 further generates a second control signal DL having an inverted level of the first control signal DH. The first control signal DH is provided to the gate of the first transistor FET1. The second control signal DL is provided to the gate of the second transistor FET2.

The first transistor FET1 and the second transistor FET2 are N-channel metal oxide semiconductor (MOS) transistors. The first transistor FET1 and the second transistor FET2 are each activated in response to an H level gate signal and inactivated in response to an L level gate signal. The first transistor FET1 and the second transistor FET2 are activated and inactivated in a complementary manner in response to the first control signal DH and the second control signal DL. The activated period (or the inactivated period) of each of the transistors FET1 and FET2 is controlled based on the voltage of each of the first to third error signals Vop1, Vop2, and Vop3.

The operation of the charging circuit 10 will now be described.

When the first transistor FET1 is activated, the secondary battery BAT is supplied with current from the input voltage Vin via the choke coil L1. The current flowing through the choke coil L1 increases as time elapses in accordance with the voltage difference between the input voltage Vin and the output voltage Vout1. As a result, the current supplied to the secondary battery also increases. Further, as current flows through the choke coil L1, energy is accumulated in the choke coil L1.

When the first transistor FET1 is inactivated, the second transistor FET2, which is for synchronous rectification, is activated. This discharges the energy accumulated in the choke coil L1.

The output voltage Vout1 is expressed below.

$$Vout1=(Ton/(Ton+Toff))*Vin=(Ton/T)*Vin$$

In the expression, Ton is the period during which the first transistor FET is activated and Toff is the period during which the first transistor FET1 is inactivated. Here, T=Ton+Toff is satisfied.

The current flowing through the choke coil L1 flows toward the secondary battery BAT via the transistor FET1 during the period the first transistor FET1 is on. Thus, the average value of a current Iin flowing through the first transistor FET1 is equal to the product of the output current Iout and the duty of the transistor FET1 and expressed by the equation shown below.

$$Iin=(Ton/T)*Iout$$

Based on the above expression, the control circuit 11 compensates for a change in the input voltage Vin by controlling the duty of the transistor FET1. The control circuit 11 further compensates for a change in the output voltage Vout1 that may occur when the consumption current of the load fluctuations by detecting the output voltage Vout1 and controlling the duty of the transistor FET1. This keeps the output voltage Vout constant.

When the consumption current of the load increases, the current flowing through the first resistor RS1 increases. As a result, the voltage drop caused by the first resistor RS1 increases. This decreases the difference between the output voltage of the first voltage amplifier AMP1 and the voltage of the reference power supply e1 and lowers the voltage of the first error signal Vop1. As a result, the output pulse width of the PWM comparator 100 is narrowed, and the activated period of the transistor FET1 is shortened. In this case, the output voltage Vout1 decreases, and the charging current of the secondary battery BAT decreases.

When the consumption current of the load decreases, the current flowing through the first resistor RS1 decreases. As a result, the voltage drop caused by the first resistor RS1 decreases. This increases the difference between the output voltage of the first voltage amplifier AMP1 and the voltage of the reference power supply e1 and increases the voltage of the first error signal Vop1. As a result, the output pulse width of the PWM comparator 100 is widened, and the activated period of the transistor FET1 is lengthened. In this case, the output voltage Vout1 increases, and the charging current of the secondary battery BAT increases.

In this manner, the charging circuit 10 controls the charging current of the secondary battery BAT in accordance with the amount of consumption current of the load by controlling the duty of the transistor FET1 (the ratio of the activated period and the inactivated period). As a result, the input current of the charging circuit 10 is controlled in a manner that it does not exceed the rated current of the external power supply.

However, the consumption current of the load may increase transiently. For example, an HDD starts driving its spindle motor when activated. Thus, the HDD requires a greater power when the HDD is activated than when the spindle motor is being driven at constant rotation velocity. However, the current supplying capability of the USB interface is limited. Accordingly, it is difficult to drive an electronic device that temporarily requires a large amount of current, such as an HDD, with only the power supplied through the USB.

Japanese Laid-Open Patent Publication No. 2000-029544 describes a circuit for monitoring the consumption current of a load. When the consumption current of the load exceeds the rated current of an external power supply, a secondary battery BAT is used to compensate for the insufficient amount of current. However, the charging circuit 10 shown in FIG. 1 supplies current from the secondary battery BAT to the load via the diode D1. Further, the voltage of the secondary battery BAT is lower than the input voltage Vin. Thus, it is impossible to supply current from the secondary battery BAT to the load when the input voltage Vin is being supplied. In other words, the charging circuit 10 fails to perform an appropriate charging operation when a transient load fluctuation occurs. To solve this problem, for example, a charging circuit 20 (DC-DC converter) shown in FIG. 2 may be used.

The charging circuit 20 supplies output voltage Vout2 to a load connected to a node between a choke coil L1 and a current measuring resistor RS2. A secondary battery BAT is connected to the load via the current measuring resistor RS2. Thus, current is supplied from the secondary battery BAT to the load even when the input voltage Vin is being supplied. In other words, the charging circuit 20 performs an appropriate charging operation when a transient load fluctuation occurs.

SUMMARY OF THE INVENTION

The charging circuit 20 shown in FIG. 2 results in various secondary failures. For example, input voltage Vin of the charging circuit 20 is supplied to the load via a transistor FET1 and the choke coil L1. Thus, the charging circuit 20 constantly operates. As a result, the consumption power of the charging circuit 20 is greater than the consumption power of the charging circuit 10 shown in FIG. 1. Further, since the charging circuit 20 constantly operates, the output voltage Vout2 is constantly supplied to the secondary battery BAT. This overcharges the secondary battery BAT. Further, during charging, output voltage Vout1 is determined by the voltage of the secondary battery BAT and the charging current. Thus, when the consumption current of the load fluctuations, the output voltage Vout1 changes. As a result, the output voltage Vout1 cannot be stabilized.

The present invention provides a circuit and a method for controlling a DC-DC converter to generate a stable output voltage and perform an appropriate charging operation when a transient load fluctuation occurs.

One aspect of the present invention is a DC-DC converter for use in an electronic device that receives an input current and includes a load that operates on the input current and a secondary battery. The DC-DC converter includes a control circuit which detects the input current, compares the detected input current with a predetermined value, and based on the comparison, controls a positive charging current for charging the secondary battery and a negative charging current supplied from the secondary battery to the load.

A further aspect of the present invention is a control circuit for a DC-DC converter for use in an electronic device that receives an input current and includes a load that operates on the input current and a secondary battery. The control circuit includes a current detection device which detects the input current and generates a current detection signal. The control circuit compares the current detection signal with a predetermined value, and based on the comparison, controls a positive charging current for charging the secondary battery and a negative charging current supplied from the secondary battery to the load.

Another aspect of the present invention is an electronic device for receiving an input current. The electronic device includes a DC-DC converter which generates a charging current from the input current. A load operates on the input current. A secondary battery is charged by the charging current. The DC-DC converter includes a control circuit for detecting the input current, compares the detected input current with a predetermined value, and based on the comparison, controls a positive charging current for charging the secondary battery and a negative charging current supplied from the secondary battery to the load.

A further aspect of the present invention is a method for controlling a DC-DC converter for use in an electronic device that receives an input current and includes a load that operates on the input current and a secondary battery. The method includes detecting the input current to generate a current detection signal, comparing the current detection signal with a predetermined value to generate a signal indicating the comparison, and controlling, based on the signal indicating the comparison, a positive charging current for charging the secondary battery and a negative charging current supplied from the secondary battery to the load.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 4:
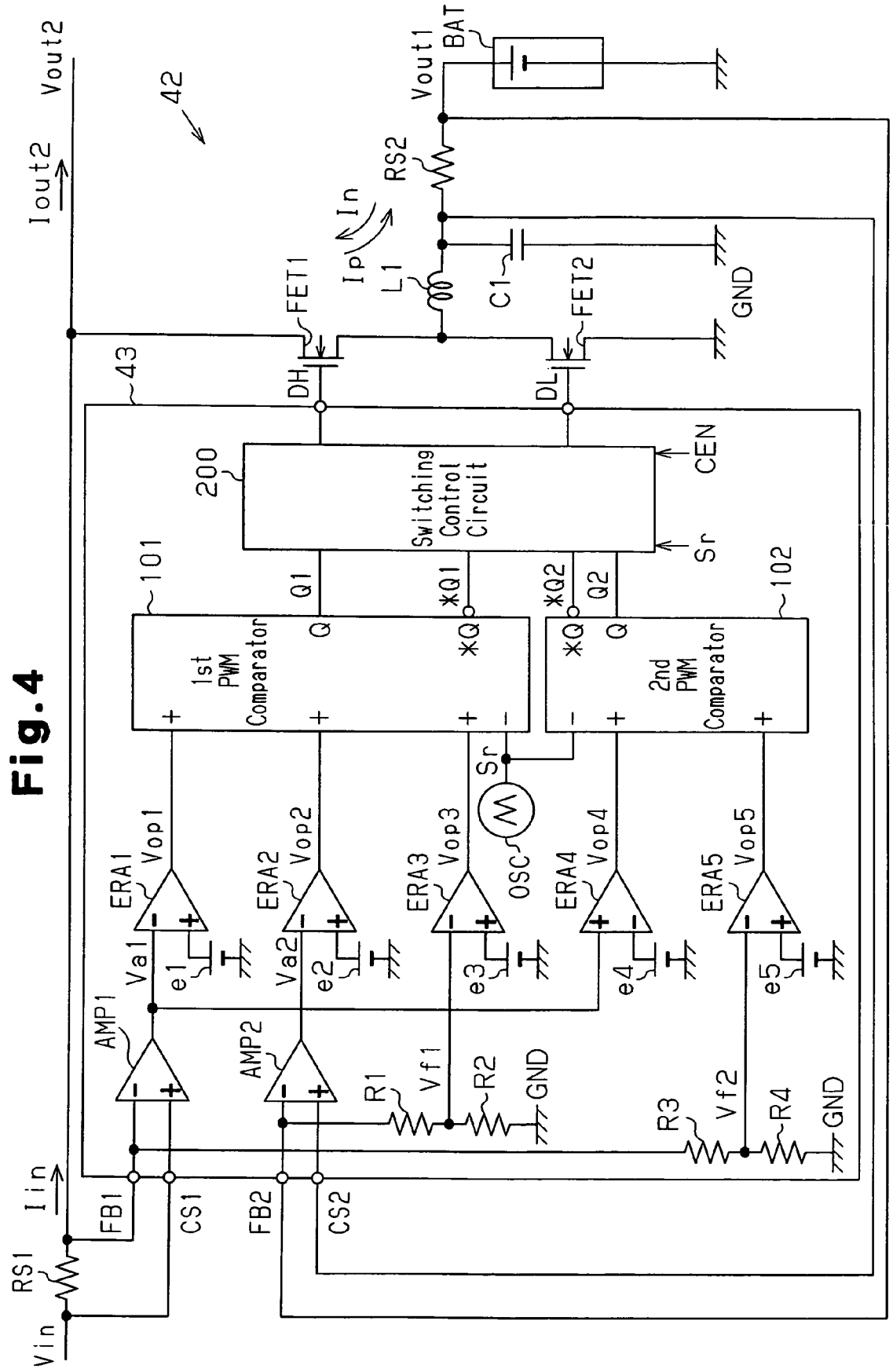
FIG. 4 is a schematic block circuit diagram of the DC-DC converter of FIG. 3.
Figure 5:
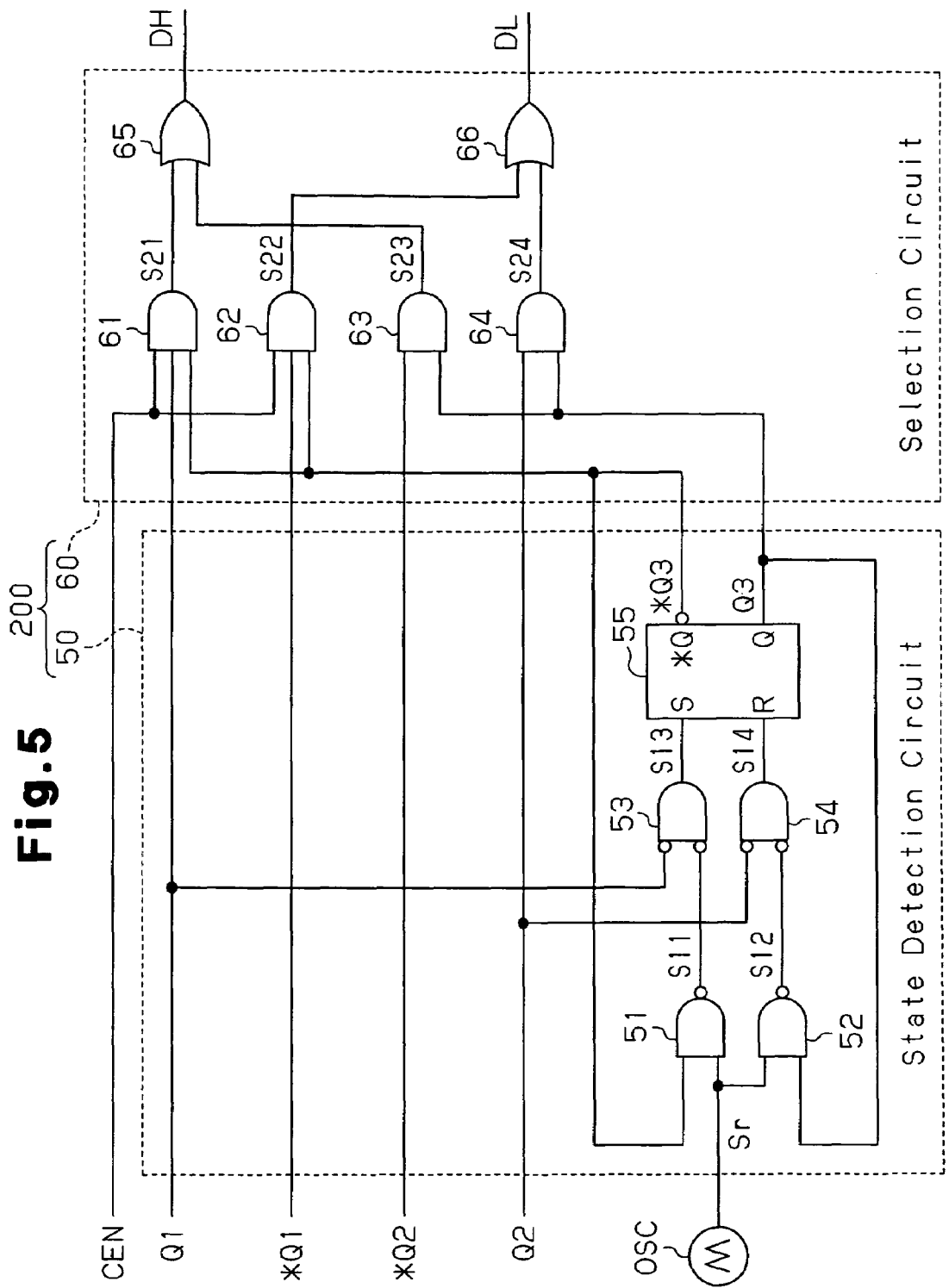
FIG. 5 is a circuit diagram of a switching control circuit shown in FIG. 4.

A DC-DC converter 42 according to a preferred embodiment of the present invention will now be described with reference to FIGS. 3 to 5.

Figure 3:
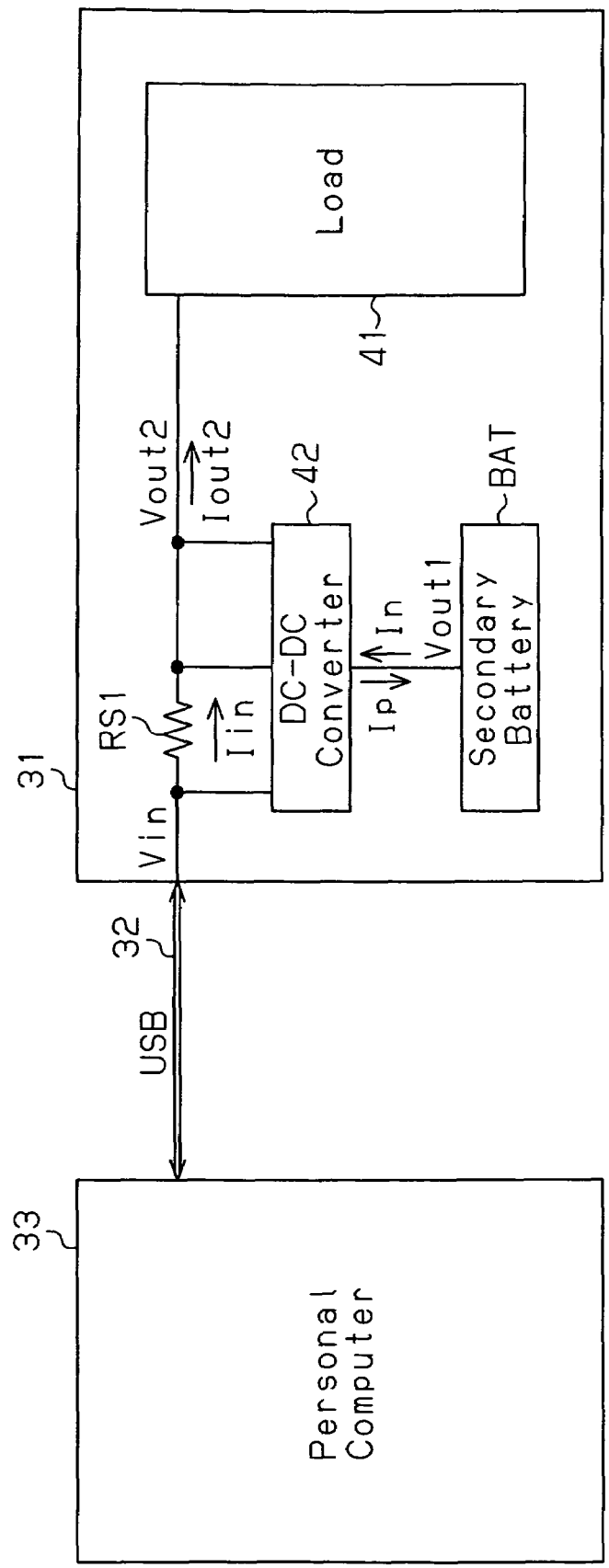
FIG. 3 is a schematic block circuit diagram of an electronic device including a DC-DC converter according to a preferred embodiment of the present invention.

FIG. 3 is a schematic block circuit diagram of an electronic device 31 including the DC-DC converter 42. The electronic device 31 is connected to a personal computer 33 via a USB cable 32. The electronic device 31 is, for example, a hard disk drive (HDD), and operates based on a power supplied from the personal computer 33 via the USB cable 32. In other words, the personal computer 33 functions as an external power supply of the electronic device 31. The electronic device 31 is supplied with voltage Vin.

The electronic device 31 includes a load 41, the DC-DC converter 42, and a secondary battery BAT. The load 41 includes a circuit for reading and writing data to and from a disk, and a mechanism for driving and rotating the disk. The operating voltage of the load 41 is set at voltage Vout2, which is substantially equal to the input voltage Vin.

The DC-DC converter 42 includes a current measuring resistor RS1, which is connected between the USB cable 32 and the load 41. The DC-DC converter 42 is connected to the secondary battery BAT. The DC-DC converter 42 measures the amount of current flowing toward the load 41 using the current measuring resistor RS1 and controls the charging current of the secondary battery BAT based on the measurement result.

In detail, the voltage drop that occurs in the current measuring resistor RS1 changes in accordance with current Iin, which flows through the resistor RS1. The current Iin flowing through the resistor RS1 is the synthesized current of current Iout2 supplied to the load 41, or a consumption current of the load 41, and the charging current of the secondary battery BAT. When the current flowing toward the secondary battery BAT is a positive charging current Ip and the current flowing from the secondary battery BAT is a negative charging current In, the input current Iin flowing through the current measuring resistor RS1 when the positive charging current Ip flows from the DC-DC converter 42 toward the secondary battery BAT is expressed as shown below.

$$Iin = Iout2 + Ip$$

The input voltage Vin when the negative charging current In flows from the secondary battery toward the DC-DC converter 42 is expressed as shown below.

$$Iin = Iout2 - In$$

As a result, the output current Iout2 supplied to the load 41 is expressed as shown below.

$$Iout2 = Iin + In$$

Accordingly, when the consumption current Iout2 of the load 41 is smaller than the input current Iin, that is, the rated current of the USB interface of the personal computer 33 (external power supply), the DC-DC converter 42 supplies the negative charging current Ip toward the secondary battery BAT. The DC-DC converter 42 controls the charging current Ip and charges the secondary battery BAT with the charging current Ip, which is less than or equal to the range of the rated current, while operating the load 41. When the load 41 temporarily requires a current greater than the rated current, the DC-DC converter 42 supplies the negative charging current In toward the load 41 from the secondary battery BAT. In other words, the DC-DC converter 42 supplies the current In from the secondary battery BAT in addition to the current Iin supplied via the USB cable 32. As a result, the load 41 operates stably.

Figure 2:
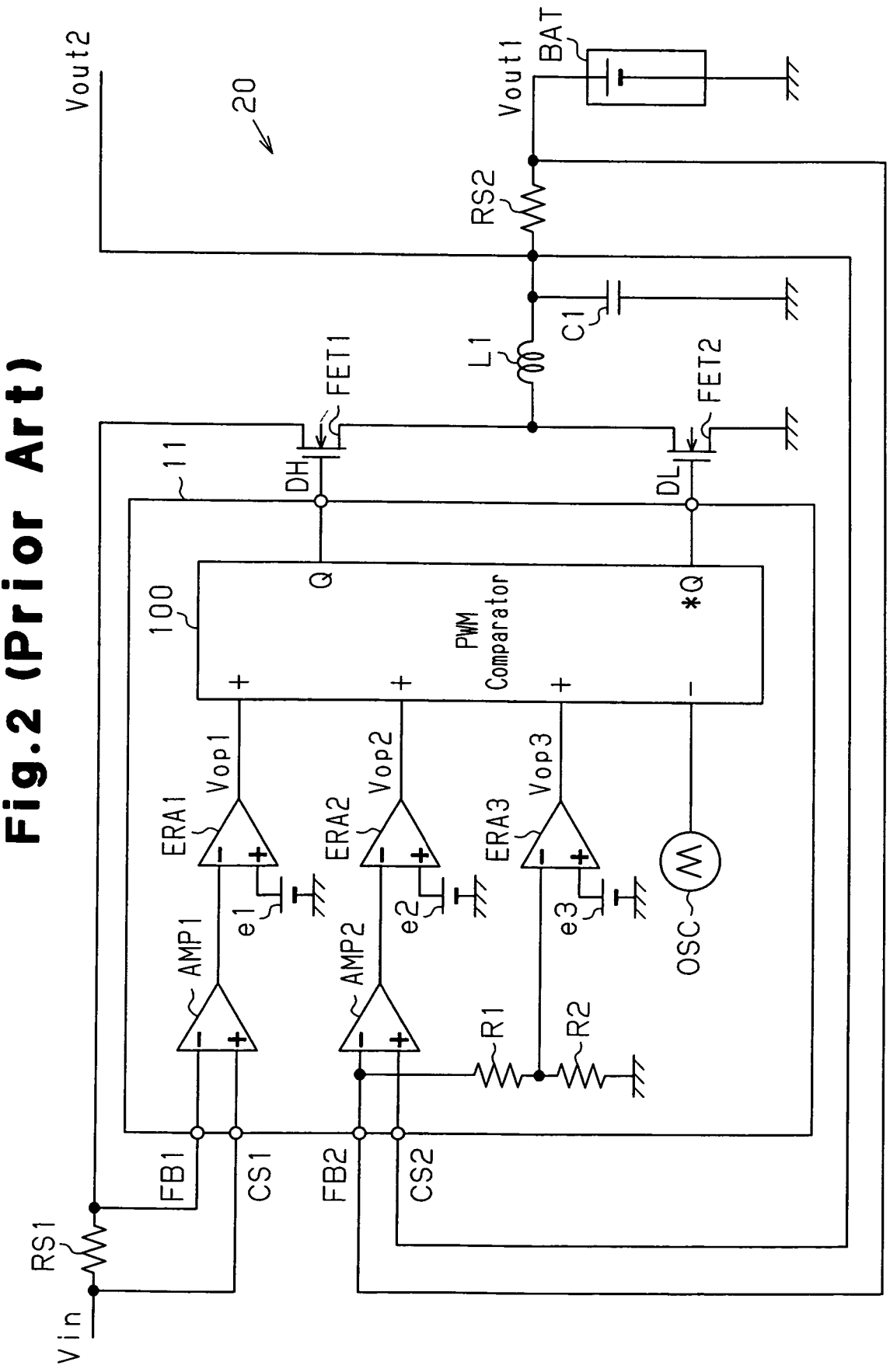
FIG. 2 is a schematic block circuit diagram of a further charging circuit (DC-DC converter) in the prior art.

The DC-DC converter 42 does not control the current directly supplied from the USB cable 32 to the load 41. The DC-DC converter 42 measures the charging amount of the secondary battery BAT. When the charging of the secondary battery BAT is completed, the DC-DC converter 42 stops the charging. Thus, when the secondary battery BAT is not being charged, the consumption current of the DC-DC converter 42 is composed of only the power consumed in its circuit elements. As a result, the average consumption power of the DC-DC converter 42 is smaller than the average consumption power of the prior art DC-DC converter shown in FIG. 2.

Further, the charging voltage of the secondary battery BAT is less than the voltage Vout2 supplied to the load 41. Thus, the DC-DC converter 42 functions as a step-down DC-DC converter for lowering the input voltage Vin to the charging voltage when charging the secondary battery BAT. The DC-DC converter 42 operates as a step-up DC-DC converter for raising the charging voltage of the secondary battery BAT to the output voltage Vout2 when supplying current from the secondary battery BAT to the load 41.

The configuration of the DC-DC converter 42 will now be described with reference to FIG. 4.

The DC-DC converter 42 includes a control circuit 43, a main switching transistor (hereafter, referred to as the first transistor) FET 1, a synchronous rectification transistor (hereafter, referred to as a second transistor) FET2, a choke coil L1, a smoothing capacitor C1, and first and second current measuring resistors RS1 and RS2. The first transistor FET1 and the second transistor FET2 are N-channel MOS transistors. The first transistor FET1 has a drain supplied with the voltage Vout2 and a source connected to the drain of the second transistor FET2. The second transistor FET2 has a source connected to ground GND. The first transistor FET1 and the second transistor FET2 have gates connected to the control circuit 43 and respectively provided with a first switching control signal DH and a second switching control signal DL from the control circuit 43.

A node between the first transistor FET1 and the second transistor FET2 is connected to a first terminal of the choke coil L1. The choke coil L1 has a second terminal connected to a first terminal of the second current measuring resistor RS2. The second current measuring resistor RS2 has a second terminal connected to the secondary battery BAT. The second terminal of the choke coil L1 is also connected to a first terminal of the capacitor C1. The capacitor C1 has a second terminal connected to ground GND.

The control circuit 43 is connected to the two terminals of the first current measuring resistor RS1 and to the two terminals of the second current measuring resistor RS2. The control circuit 43 measures a first current amount, which is the amount of current that flows through the resistor RS1 as a result of the voltage drop that occurs in the first current measuring resistor RS1. The control circuit 43 also measures a second current amount, which is the amount of current that flows through the resistor RS2 as a result of the voltage drop that occurs in the second current measuring resistor RS2. Based on the first current amount and the second current amount, the control circuit 43 generates complementary first and second switching control signals DH and DL for activating and inactivating the first transistor FET1 and the second transistor FET2.

The control circuit 43 includes first and second voltage amplifiers AMP1 and AMP2, first to fifth error amplifiers ERA1, ERA2, ERA3, ERA4, and ERA5, a triangular wave oscillator OSC, first and second PWM comparators 101 and 102, a switching control circuit (SW control circuit) 200, first to fifth reference power supplies e1, e2, e3, e4, and e5, and first to fourth resistors R1, R2, R3, and R4.

The first voltage amplifier AMP1 (current detection device) has a non-inversion input terminal connected to a first terminal of the first current measuring resistor RS1 and provided with a signal CS1 having the voltage at the first terminal of the first current measuring resistor RS1. The first voltage amplifier AMP1 also has an inversion input terminal connected to a second terminal of the first current measuring resistor RS1 and provided with a signal FB1 having the voltage of the second terminal of the first current measuring resistor RS1. The first voltage amplifier AMP1 amplifies the potential difference between the two terminals of the first current measuring resistor RS1. An output voltage Va1 of the first voltage amplifier AMP1 corresponds to the current flowing through the first current measuring resistor RS1.

The second voltage amplifier AMP2 has a non-inversion input terminal connected to a first terminal of the second current measuring resistor RS2 and provided with a signal CS2 having the voltage at the first terminal of the second current measuring resistor RS2. The second voltage amplifier AMP2 has an inversion input terminal connected to a second terminal of the second current measuring resistor RS2 and provided with a signal FB2 having the voltage at the second terminal of the second current measuring resistor RS2. The second voltage amplifier AMP2 amplifies the potential difference between the two terminals of the second current measuring resistor RS2. An output voltage Va2 of the second voltage amplifier AMP2 corresponds to the current flowing through the second current measuring resistor RS2. More specifically, this current corresponds to the positive charging current supplied to the secondary battery BAT or the negative charging current discharged from the secondary battery BAT.

The first resistor R1 has a first terminal provided with a feedback signal FB2 and a second terminal connected to a first terminal of the second resistor R2. The second resistor R2 has a second terminal connected to the ground GND. The first resistor R1 and the second resistor R2 form a voltage dividing circuit and divide the voltage of the signal FB2 with their resistances to generate a first divided voltage Vf1. The voltage of the signal FB2 is equal to the output voltage Vout1. The first divided voltage Vf1 is generated by dividing the output voltage Vout1.

The third resistor R3 has a first terminal provided with a feedback signal FB1 and a second terminal connected to a first terminal of the fourth resistor R4. The fourth resistor R4 has a second terminal connected to the ground GND. The third resistor R3 and the fourth resistor R4 form a voltage dividing circuit and divide the voltage of the signal FB1 with their resistances to generate a second divided voltage Vf2. The voltage of the signal FB1 is equal to the output voltage Vout2. The second divided voltage Vf2 is generated by dividing the output voltage Vout2.

The first error amplifier ERA1 has an inversion input terminal connected to an output terminal of the first voltage amplifier AMP1 and supplied with an output voltage Va1 of the voltage amplifier AMP1. The first error amplifier ERA1 also has a non-inversion input terminal connected to a first reference power supply e1 and supplied with a first reference voltage from the power supply e1. The first error amplifier ERA1 amplifies the voltage difference between the first reference voltage and the output voltage Va1 of the first voltage amplifier AMP1 to generate a first error signal Vop1.

The second error amplifier ERA2 has an inversion input terminal connected to an output terminal of the second voltage amplifier AMP2 and supplied with an output voltage Va2 of the voltage amplifier AMP2. The second error amplifier ERA2 also has a non-inversion input terminal connected to a second reference power supply e2 and supplied with a second reference voltage corresponding to a reference current from the power supply e2. The second error amplifier ERA2 amplifies the voltage difference between the second reference voltage and the output voltage Va2 of the second voltage amplifier AMP2 to generate a second error signal Vop2.

The third error amplifier ERA3 has an inversion input terminal supplied with a first divided voltage Vf1 and a non-inversion input terminal supplied with a third reference voltage from a third reference power supply e3. The third error amplifier ERA3 amplifies the voltage difference between the third reference voltage and the first divided voltage Vf1 to generate a third error signal Vop3.

The fourth error amplifier ERA4 has a non-inversion input terminal connected to an output terminal of the first voltage amplifier AMP1 and provided with an output signal of the voltage amplifier AMP1. The fourth error amplifier ERA4 also has an inversion input terminal connected to a fourth reference power supply e4 and supplied with a fourth reference voltage from the power supply e4. The fourth error amplifier ERA4 amplifies the voltage difference between the fourth reference voltage and the output voltage of the fourth voltage amplifier AMP1 to generate a fourth error signal Vop4.

The fifth error amplifier ERA5 has an inversion input terminal supplied with a second divided voltage Vf2 and a non-inversion input terminal supplied with a fifth reference voltage of the fifth reference power supply e5. The fifth error amplifier ERA5 amplifies the voltage difference between the fifth reference voltage and the second divided voltage Vf2 to generate a fifth error signal Vop5.

The first PWM comparator 101 has three non-inversion input terminals and one inversion input terminal. The non-inversion input terminals of the first PWM comparator 101 are provided with the first to third error signals Vop1, Vop2, and Vop3, respectively. The inversion input terminal of the first PWM comparator 101 is provided with a triangular wave signal Sr, which is generated by the oscillator OSC. The first PWM comparator 101 compares the triangular wave signal Sr with the first to third error signals Vop1, Vop2, and Vop3 to generate complementary first and second control signals Q1 and *Q1, each having a pulse width that is in accordance with the comparison result. In detail, the first PWM comparator 101 compares the one of the first to third error signals Vop1, Vop2, and Vop3 having the lowest voltage with the triangular wave signal Sr. The first PWM comparator 101 generates an H level first control signal Q1 when the voltage of the error signal is higher than the voltage of the triangular wave signal Sr and generates an L level first control signal Q1 when the voltage of the error signal is lower than the voltage of the triangular wave signal Sr. Further, the first PWM comparator 101 generates a second control signal *Q1 having an inverted level of the first control signal Q1. The first and second control signals Q1 and *Q1 are provided to the SW control circuit 200.

The second PWM comparator 102 has two non-inversion input terminals and one inversion input terminal. The non-inversion input terminals of the second PWM comparator 102 are respectively provided with the fourth error signal Vop4 and the fifth error signal Vop5. The inversion input terminal of the second PWM comparator 102 is provided with the triangular wave signal Sr, which is generated by the oscillator OSC. The second PWM comparator 102 compares the triangular wave signal Sr with the fourth and fifth error signals Vop4 and Vop5 and generates complementary third and fourth control signals Q2 and *Q2, each having a pulse width that is in accordance with the comparison result. In detail, the second PWM comparator 102 compares the one of the fourth and fifth error signals Vop4 and Vop5 having the lowest voltage with the triangular wave signal Sr. The second PWM comparator 102 generates an H level third control signal Q2 when the voltage of the error signal is higher than the voltage of the triangular wave signal Sr and generates an L level third control signal Q2 when the voltage of the error signal is lower than the voltage of the triangular wave signal Sr. Further, the second PWM comparator 102 generates a fourth inversion control signal *Q2 having an inverted level of the third control signal Q2. The third and fourth control signals Q2 and *Q2 are provided to the SW control circuit 200.

The SW control circuit 200 detects the operation state of the DC-DC converter 42 based on the first and second control signals Q1 and *Q1 and the third and fourth control signals Q2 and *Q2. Based on the detection result, the SW control circuit 200 provides the first and second transistors FET1 and FET2 with either the first and second controls signals Q1 and *Q1 or the fourth and third control signals *Q2 and Q2 as the first and second switching control signals DH and DL.

In detail, the DC-DC converter 42 operates in states including normal operation and transient operation. The SW control circuit 200 detects whether the DC-DC converter 42 is in the normal operation state or the transient operation state based on the first and second control signals Q1 and *Q1 and the third and fourth control signals Q2 and *Q2. The DC-DC converter 42 supplies the load 41 with a current Iout2 that is smaller than the rated current of the external power supply (the rated current of the USB interface) during the normal operation and supplies a current Iout2 that is greater than the rated current during the transient operation. In other words, the consumption current of the load 41 is greater than the rated current during the transient operation.

When the current Iin flowing through the first current measuring resistor RS1 increases, the potential difference between the two input terminals of the first voltage amplifier AMP1 increases. As a result, the voltage of the first error signal Vop1 decreases. In this state, the voltage of the fourth error signal Vop4 increases. Each of the first reference voltage e1 and the fourth reference voltage e4 is set in accordance with the rated current of the external power supply so that one of the first error signal Vop1 and the fourth error signal Vop4 changes within the amplitude of the triangular wave signal Sr. As a result, either the first and second control signals Q1 and *Q1 or the third and fourth control signals Q2 and *Q2 are generated as a pair of pulse signals, with each signal having a pulse width that is in accordance with the voltage level of the triangular wave signal Sr. In this manner, the SW control circuit 200 detects whether the DC-DC converter 42 is in the normal operation state or the transient operation state by detecting which one of the pairs of the first and second control signals Q1 and *Q1 and the third and fourth control signals Q2 and *Q2 has been generated as the pair of pulse signals.

When the DC-DC converter 42 is in the normal operation state, the SW control circuit 200 provides the first transistor FET1 with the first control signal Q1 as the first switching control signal DH and provides the second transistor FET2 with the second control signal *Q1 as the second switching control signal DL. When the DC-DC converter 42 is in the transient operation state, the SW control circuit 200 provides the first transistor FET1 with the fourth control signal *Q2 as the first switching control signal DH and provides the second transistor FET2 with the third control signal Q2 as the second switching control signal DH.

The first transistor FET1 is activated and inactivated in response to the first control signal Q1 or the fourth control signal *Q2. The second transistor FET2 is activated and inactivated in response to the second control signal *Q1 or the third control signal Q2.

Figure 1:
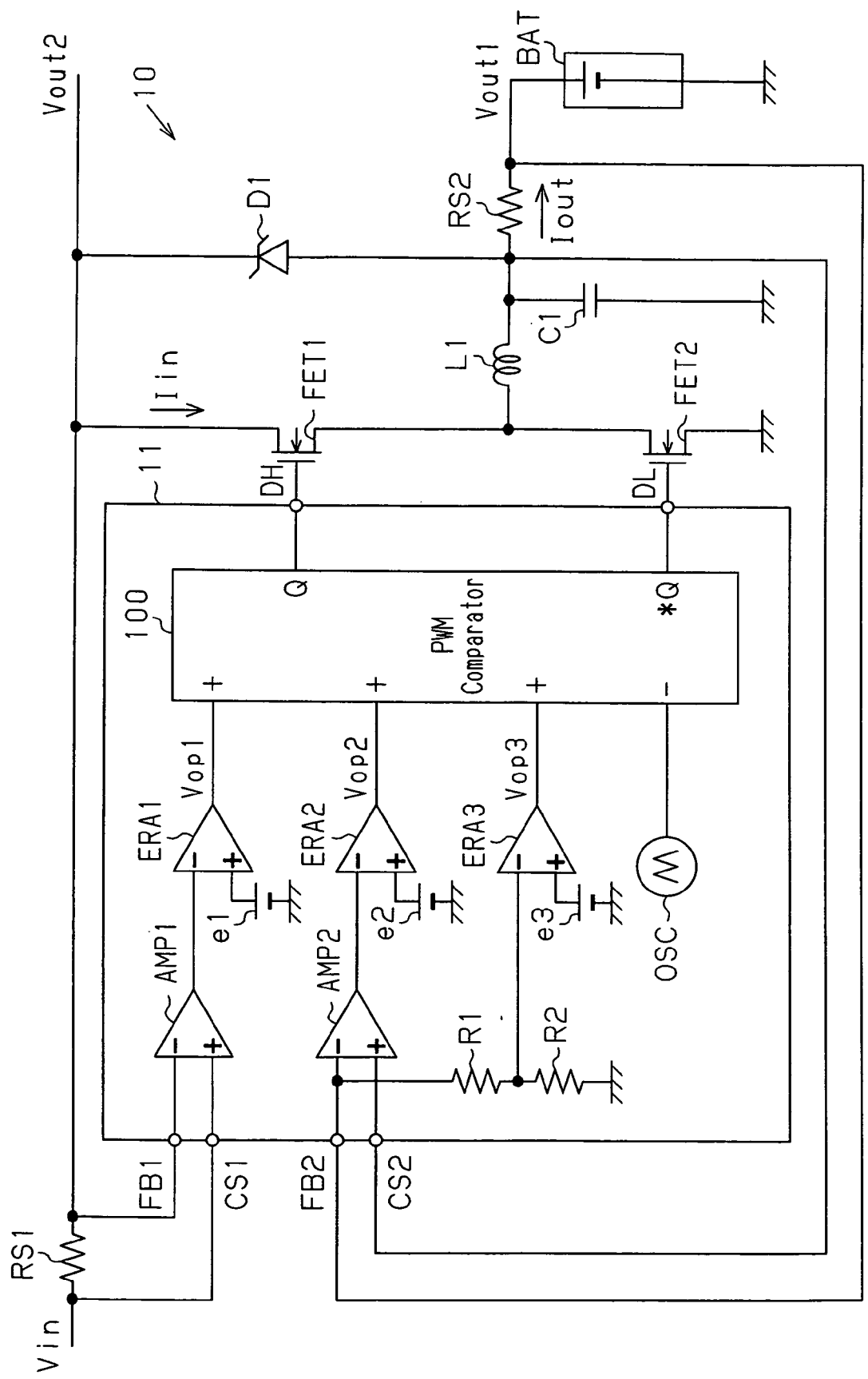
FIG. 1 is a schematic block circuit diagram of a charging circuit (DC-DC converter) in the prior art example.

Thus, when the current Iout2 supplied to the load 41 (refer to FIG. 1) is smaller than the USB rated current, the DC-DC converter 42 activates and inactivates the first transistor FET1 and the second transistor FET2 based on the first to third error signals Vop1, Vop2, and Vop3, which are provided to the first PWM comparator 101. In this case, the voltage of the first error signal Vop1 is higher than the voltage of each of the second and third error signals Vop2 and Vop3. As a result, the DC-DC converter 42 substantially activates and inactivates the first transistor FET1 and the second transistor FET2 based on the second and third error signals Vop2 and Vop3. The second error signal Vop2 corresponds to the potential difference between the two terminals of the current measuring resistor RS2, that is, the positive charging current Ip supplied to the secondary battery BAT. The third error signal Vop3 corresponds to the potential at the second terminal of the current measuring resistor RS2, that is, the output voltage Vout1. The control circuit 43 of the DC-DC converter 42 provides the first transistor FET1 and the second transistor FET2 respectively with the first and second control signals Q1 and *Q1, each having a pulse width that is in accordance with the voltage of the second error signal Vop2 or the third error signal Vop3 as the first and second switching control signals DH and DL.

<Normal Operation>

When the first transistor FET1 is activated in response to the first switching control signal DH, the charging current is supplied from the input voltage Vin to the secondary battery BAT via the choke coil L1. The current flowing through the choke coil L1 increases as time elapses in accordance with the voltage difference between the input voltage Vin and the output voltage Vout1 of the DC-DC converter 42. As a result, the charging current supplied to the secondary battery BAT also increases. Further, since current flows through the choke coil L1, energy is accumulated in the choke coil L1. When the first transistor FET1 is inactivated, the second transistor FET2 for synchronous rectification is activated. This discharges the energy accumulated in the choke coil L1.

The current flowing through the choke coil L1 flows toward the secondary battery BAT via the transistor FET1 during the period the first transistor FET1 is activated. As a result, the average value of the current Iin flowing through the first transistor FET1 is equal to the product of the output current (positive charging current) Ip and the duty of the first transistor FET1.

The current flowing through the current measuring resistor RS1 increases as the current supplied to the load 41 increases. As a result, the voltage drop that occurs in the current measuring resistor RS1 increases. Then, the difference between the output voltage of the first voltage amplifier AMP1 and the voltage of the first reference power supply e1 decreases, and the voltage of the first error signal Vop1 decreases. As a result, the pulse width of the output pulse (the pulse of each of the first and second control signals Q1 and *Q1) is narrowed, and the activated period of the first transistor FET1 is shortened. This lowers the output voltage Vout1 and decreases the charging current of the secondary battery BAT.

The current flowing through the current measuring resistor RS1 decreases as the current supplied to the load 41 decreases. This decreases the voltage drop that occurs in the current measuring resistor RS1. Then, the difference between the output voltage of the first voltage amplifier AMP1 and the voltage of the first reference power supply e1 increases, and the voltage of the first error signal Vop1 increases. As a result, the pulse width of the output pulse (the pulse of each of the first and second control signals Q1 and *Q1) is widened, and the activated period of the first transistor FET1 is lengthened. As a result, the output voltage Vout1 increases, and the charging current of the secondary battery BAT increases.

In this manner, the DC-DC converter 42 controls the duty (the ratio of the activated period and the inactivated period) of the first transistor FET1 to control the output voltage Vout1 in accordance with the amount of current supplied to the load 41 and controls the charging current (the positive charging current Ip) of the secondary battery BAT. As a result, the input current Iin of the DC-DC converter 42 is controlled in a manner that it does not exceed the rated current of the external power supply.

The DC-DC converter 42 controls the positive charging current Ip supplied to the secondary battery BAT or the output voltage Vout1 based on the second error signal Vop2 or the third error signal Vop3. In other words, the DC-DC converter 42 controls the positive charging current Ip based on the second error signal Vop2 in a manner that the output voltage of the second voltage amplifier AMP2 coincides with the reference voltage of the second reference power supply e2. Alternatively, the DC-DC converter 42 controls the output voltage Vout1 based on the third error signal Vop3 in a manner that the divided voltage Vf1 coincides with the reference voltage of the third reference power supply e3. The reference voltage of the second reference power supply e2 is set to correspond to the positive charging current Ip. The reference voltage of the third reference power supply e3 is set to correspond to the output voltage Vout1. In this manner, the DC-DC converter 42 charges the secondary battery BAT through the current control for controlling the charging current Ip based on the second error signal Vop2 or through the voltage control for controlling the output voltage Vout1 based on the third error signal Vop3.

<Transient Operation>

During the transient operation, the DC-DC converter 42 uses the second transistor FET2 as a main transistor and uses the first transistor FET1 as a synchronous rectification transistor. When the second transistor FET2 is activated, the discharging current that is in accordance with the voltage of the secondary battery BAT (output voltage Vout1), that is, the negative charging current In, flows through the choke coil L1. The current flowing through the choke coil L1 increases as time elapses in accordance with the potential difference between the two terminals of the choke coil L1. As a result, the current flowing through the load 41 also increases. Further, since current flows through the choke coil L1, energy is accumulated in the choke coil L1. When the second transistor FET2 is inactivated, the first transistor FET1 for synchronous rectification is activated. This discharges the energy accumulated in the choke coil L1.

The energy accumulated in the choke coil L1 when the second transistor FET2 is activated is equal to the energy discharged from the choke coil L1 when the second transistor FET2 is inactivated. When the activated period of the second transistor FET2 is Ton and the inactivated period of the second transistor FET2 is Toff, the output voltage Vout2 is expressed as shown below.

$$Vout2 = ((Ton + Toff)/Toff) * Vout1 = (T/Toff) * Vout1.$$

In this equation, T=Ton+Toff is satisfied.

Based on the above expression, the control circuit 43 of the DC-DC converter 42 compensates for a change in the voltage Vout1 by controlling the duty of the second transistor FET2. Further, the control circuit 43 detects the output voltage Vout2 and controls the duty of the second transistor FET2 to compensate for a change in the output voltage Vout2 that may occur when the consumption current of the load changes. This keeps the output voltage Vout2 constant.

When the current Iout2 supplied to the load 41 increases, the current Iin flowing through the first current measuring resistor RS1 increases. This increases the voltage drop that occurs in the first current measuring resistor RS1 increases. Then, the difference between the output voltage of the first voltage amplifier AMP1 and the voltage of the fourth reference power supply e4 increases, and the voltage of the fourth error signal Vop4 increases. As a result, the width of the output pulse of the second PWM comparator 102 (the pulse of each of the third and fourth control signals Q2 and *Q2) is widened, and the activated period of the transistor FET2 is lengthened. Accordingly, the discharging current In from the secondary battery BAT increases.

When the current Iout2 supplied to the load 41 decreases, the current Iin flowing through the first current measuring resistor RS1 decreases. This decreases the voltage drop that occurs in the first current measuring resistor RS1. Then, the difference between the output voltage of the first voltage amplifier AMP1 and the voltage of the fourth reference power supply e4 decreases, and the voltage of the fourth error signal Vop4 decreases. As a result, the output pulse of the second PWM comparator 102 (the pulse of each of the third and fourth control signals Q2 and *Q2) is narrowed, and the activated period of the transistor FET2 is shortened. Accordingly, the output voltage Vout2 decreases, and the discharging current In from the secondary battery BAT decreases.

In this manner, the DC-DC converter 42 controls the duty (the ratio of the activated period and the inactivated period) of the second transistor FET2 to control the output voltage Vout2 in accordance with the amount of current supplied to the load 41 (that is, the consumption current of the load 41) and controls the discharging current (the negative charging current In) of the secondary battery BAT. This enables the DC-DC converter 42 to supply the load 41 with a current greater than or equal to the USB rated current.

The DC-DC converter 42 controls the output voltage Vout2 based on the fourth and fifth error signals Vop4 and Vop5. In this case, the voltage of the fourth error signal Vop4 is greater than the voltage of the fifth error signal Vop5. Thus, the DC-DC converter 42 substantially activates and inactivates the first transistor FET1 and the second transistor FET2 based on the fifth error signal Vop5. The fifth reference voltage is set to correspond to the output voltage Vout2 supplied to the load 41. More specifically, the DC-DC converter 42 activates and inactivates the first transistor FET1 and the second transistor FET2 in a manner that the divided voltage Vf2 coincides with the fifth reference voltage of the fifth reference power supply e5 based on the fifth error signal Vop5 to raise the voltage of the secondary battery BAT. The DC-DC converter 42 then supplies the raised voltage to the load 41.

The configuration of the SW control circuit 200 will now be described with reference to FIG. 5.

The SW control circuit 200 includes a state detection circuit 50 and a selection circuit 60.

The state detection circuit 50 includes first and second NAND circuits 51 and 52, first and second NOR circuits 53 and 54, and an RS-FF circuit (FF circuit) 55. The first NAND circuit 51 is provided with the triangular wave signal Sr of the oscillator OSC and an inversion output signal *Q3 of the FF circuit 55. The first NAND circuit 51 has an output terminal connected to the first NOR circuit 53. The second NAND circuit 52 is provided with the triangular wave signal Sr of the oscillator OSC and a non-inversion output signal Q3 of the FF circuit 55. The second NAND circuit 52 has an output terminal connected to the second NOR circuit 54. The first NOR circuit 53 is provided with the first control signal Q1 and an output signal of the first NAND circuit 51. The first NOR circuit 53 has an output terminal connected to a set terminal S of the FF circuit 55. The second NOR circuit 54 is provided with the third control signal Q2 and an output signal of the second NAND circuit 52. The second NOR circuit 54 has an output terminal connected to a reset terminal R of the FF circuit 55. An inversion output signal *Q3 of the FF circuit 55 is provided to the first NAND circuit 51 and the selection circuit 60. A non-inversion output signal Q3 of the FF circuit 55 is provided to the second NAND circuit 52 and the selection circuit 60.

The selection circuit 60 includes first to fourth AND circuits 61, 62, 63, and 64 and first and second OR circuits 65 and 66.

The first AND circuit 61 has three input terminals for receiving a charge enablement signal CEN, the first control signal Q1, and the inversion output signal *Q3. Further, the first AND circuit 61 has an output terminal connected to the first OR circuit 65. The second AND circuit 62 has three input terminals for receiving the charge enablement signal CEN, the second control signal *Q1, and the inversion output signal *Q3. Further, the second AND circuit 62 has an output terminal connected to the second OR circuit 66. The third AND circuit 63 has two input terminals, which receive the fourth control signal *Q2 and the output signal Q3, and an output terminal, which is connected to the first OR circuit 65. The fourth AND circuit 64 has two input terminal, which receive the third control signal Q2 and the output signal Q3, and an output terminal, which is connected to the second OR circuit 66. The first OR circuit 65 generates a first switching control signal DH. The second OR circuit 66 generates a second switching control signal DL.

The operation of the SW control circuit 200 will now be described.

It is assumed here that the FF circuit 55 of the state detection circuit 50 is in a reset state and generates an L level non-inversion output signal Q3 and an H level inversion output signal *Q3. The charge enablement signal CEN has an H level.

In this state, the first AND circuit 61 generates a signal S21 having substantially the same level as the first control signal Q1. The second AND circuit 62 generates a signal S22 having substantially the same level as the second control signal *Q1. The third AND circuit 63 generates an L level signal S23. The fourth AND circuit 64 generates an L level signal S24. As a result, the first OR circuit 65 generates a first switching control signal DH having substantially the same level as the first control signal Q1. The second OR circuit 66 generates a second switching control signal DL having substantially the same level as the second control signal *Q1.

The first NAND circuit 51 generates a pulse signal S11 based on the triangular wave signal Sr of the oscillator OSC in response to an H level inversion output signal *Q3. The second NAND circuit 52 generates an H level signal S12 in response to an L level non-inversion output signal Q3.

The output signal S11 of the first NAND circuit 51 has substantially the same cycle as the triangular wave signal Sr. The first NAND circuit 51 generates an L level signal S11 when the potential of the triangular wave signal Sr provided to the first NAND circuit 51 is higher than a potential at one half the amplitude of the triangular wave signal Sr. Further, the first NAND circuit 51 generates an H level signal S11 when the potential of the triangular wave signal Sr is lower than the one half potential.

The first NOR circuit 53 generates an L level signal S13 in response to an H level signal S11 and generates a signal S13 having an inverted level of the first control signal Q1 in response to an L level signal S11. The second NOR circuit 54 generates an L level signal S14 in response to an H level signal S12.

As described above, the first control signal Q1 is a signal indicating a comparison result obtained by comparing the triangular wave signal Sr of the oscillator OSC with one of the error signals Vop1 to Vop3. The signal Q1 is set at an L level when the error signal is higher than the triangular wave signal Sr and set at an H level when the error signal is lower than the triangular wave signal Sr. As a result, the first control signal Q1 and the output signal S11 of the first NAND circuit 51 have opposite phases. In the same manner, the third control signal Q2 and the output signal S12 of the second NAND circuit 52 have opposite phases.

The first control signal Q1 is generated as a pulse signal. In this case, the first control signal Q1 has an H level when the signal S11 has an L level. The first NOR circuit 53 generates an L level signal S13, and the FF circuit 55 maintains its reset state. The second control signal Q2 is generated as a pulse signal. In this case, the first control signal Q1 is set at an L level. The first NOR circuit 53 generates an H level signal S13, and the FF circuit 55 is set.

More specifically, the FF circuit 55 generates an H level non-inversion output signal Q3 and an L level inversion output signal *Q3. Thus, the selection circuit 60 generates a first switching control signal DH having substantially the same level as the fourth control signal *Q2 and a second switching control signal DL having substantially the same level as the third control signal Q2 in accordance with the output signals S23 and S24 of the third AND circuit 63 and the fourth AND circuit 64. Accordingly, the DC-DC converter 42 performs the transient operation for activating and inactivating the first transistor FET1 and the second transistor FET2 based on the fourth and third control signals *Q2 and Q2.

The first control signal Q1 is generated as a pulse signal when the FF circuit 55 is in a set state. In this state, the second control signal Q2 is set at an L level, the second NOR circuit 54 generates an H level signal S14, and the FF circuit 55 is reset. Thus, the selection circuit 60 generates a first switching control signal DH having substantially the same level as the first control signal Q1 and a second switching control signal DL having substantially the same level as the second control signal *Q1 in accordance with the output signals S21 and S22 of the first AND circuit 61 and the second AND circuit 62. As a result, the DC-DC converter 42 performs the normal operation for activating and inactivating the first transistor FET1 and the second transistor FET2 based on the first and second control signals Q1 and *Q1.

When the charge enablement signal CEN is set at an L level during normal operation of the DC-DC converter 42, the first AND circuit 61 and the second AND circuit 62 generate L level signals S21 and S22, respectively. As a result, the selection circuit 60 generates L level first and second switching control signals DH and DL. The DC-DC converter 42 inactivates the first transistor FET1 and the second transistor FET2. More specifically, the DC-DC converter 42 stops charging and discharging the secondary battery BAT in response to the L level charge enablement signal CEN.

The DC-DC converter 42 of the preferred embodiment has the advantages described below.

(1) The DC-DC converter 42 detects the input current Iin, compares the input current Iin with the rated current of the external power supply that supplies the input current Iin, and controls the positive charging current Ip supplied to the secondary battery BAT in accordance with the consumption current of the load 41 so that the input current Iin does not exceed the rated current. Further, the DC-DC converter 42 controls the negative charging current Iin that is supplied from the secondary battery BAT to the load 41 when the load 41 requires input current Iin that exceeds the rated current. The DC-DC converter 42 supplies current from the secondary battery BAT when the consumption current of the load 41 exceeds the current supplying capability of the external power supply. As a result, the DC-DC converter 42 stably operates the load 41.

(2) The DC-DC converter 42 detects the charging current of the secondary battery BAT flowing through the current measuring resistor RS2 and charges the secondary battery BAT based on the charging current and the charging voltage Vout1 of the secondary battery BAT. The DC-DC converter 42 then supplies power to the load 41 via the first current measuring resistor RS1. The DC-DC converter 42 further uses negative charging current from the secondary battery BAT when the current supplied to the load 41 is insufficient.

Accordingly, the DC-DC converter 42 operates when charging the secondary battery BAT and when supplying a current from the secondary battery BAT to the load 41. In other words, the DC-DC converter 42 operates intermittently. Thus, the operating time of the DC-DC converter 42 is shorter than the operating time of the prior art DC-DC converter shown in FIG. 2. As a result, the consumption power of the DC-DC converter 42 is prevented from increasing.

It should be apparent to those skilled in the art that the present invention may be embodied in many other specific forms without departing from the spirit or scope of the invention. Particularly, it should be understood that the present invention may be embodied in the following forms.

In the above embodiment, the DC-DC converter 42 may detect the input current Iin using only one reference voltage corresponding to the rated current of the external power supply.

Figure 6:
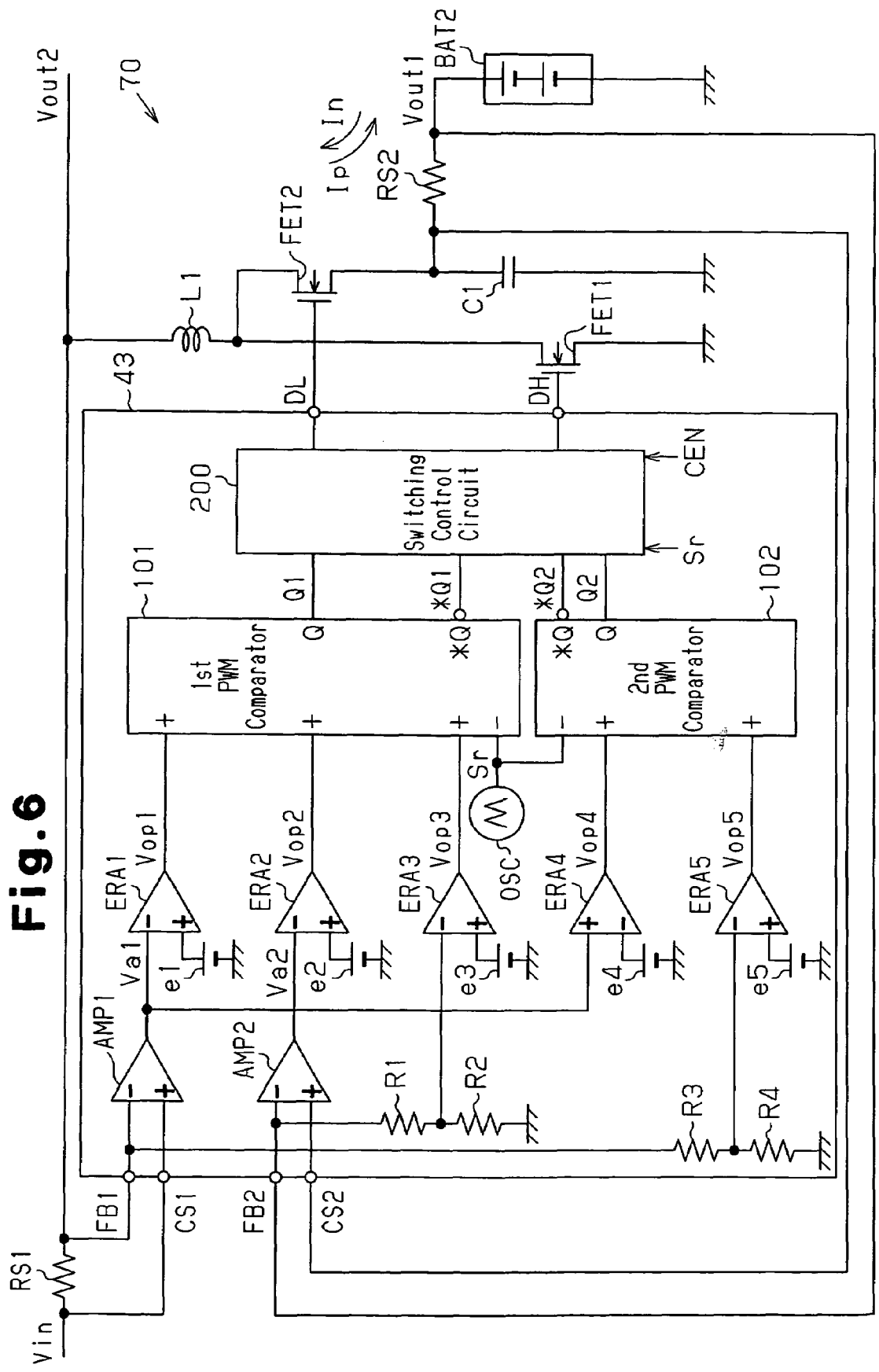
FIG. 6 is a schematic block circuit diagram of a DC-DC converter according to a further embodiment of the present invention.

In the above embodiment, the DC-DC converter may control the charging current that is supplied to the secondary battery using a charging voltage that is higher than the input voltage Vin. For example, a DC-DC converter 70 shown in FIG. 6 charges and discharges a secondary battery BAT2 using a charging voltage that is higher than a voltage Vout2, which is supplied to a load 41 (refer to FIG. 3). A first transistor FET1 is activated and inactivated based on a first switching control signal DH. The first transistor FET1 has a source connected to ground GND and a drain connected to a second transistor FET2. A node between the first transistor FET1 and the second transistor FET2 is connected to the load 41 via a choke coil L1. The second transistor FET2 has a drain connected to the choke coil L1 and a source connected to ground GND via a smoothing capacitor C1. A node between the second transistor FET2 and the capacitor C1 is connected to the secondary battery BAT2 via a second current measuring resistor RS2.

The DC-DC converter 70 activates and inactivates the first transistor FET1 and the second transistor FET2 to raise the input voltage Vin and generate an output voltage Vout1. The DC-DC converter 70 charges the secondary battery BAT2 with the output voltage Vout1. The DC-DC converter 70 activates and inactivates the first transistor FET1 and the second transistor FET2 to lower the voltage Vout1 of the secondary battery BAT2 and supply the lowered voltage to the load 41.

The DC-DC converter 70 supplies current from the secondary battery BAT2 to the load 41 when the consumption current of the load 41 exceeds the rated current of the external power supply. As a result, the DC-DC converter 70 operates the load 41 stably.

In each of the above embodiments, the electronic device 31 may be connected to the personal computer 33 (external power supply) via other interfaces, such as an IEEE1394 or a PCMCIA. Further, the external power supply is not limited to the personal computer 33 and may be an AC adaptor.

In each of the above embodiments, the transistors FET1 and FET2 may be P-channel MOS transistors. Alternatively, one of the transistors FET1 and FET2 may be a P-channel MOS transistor and the other one of the transistors FET1 and FET2 may be an N-channel MOS transistor.

The DC-DC converters 42 and 70 or the control circuits of the DC-DC converters 42 and 70 may be formed as a single chip semiconductor or a module such as a printed circuit board. Further, it is obvious that the DC-DC converters 42 and 70 may be used as power supply devices.

The present examples and embodiments are to be considered as illustrative and not restrictive, and the invention is not to be limited to the details given herein, but may be modified within the scope and equivalence of the appended claims.

What is claimed is:

1. A DC-DC converter for use in an electronic device that receives an input current and includes a load that operates on the input current and a secondary battery, the DC-DC converter comprising:
a control circuit which includes:
a first detector which detects whether or not the input current exceeds a first reference value corresponding to a rated supply current to generate a first detection signal;
a second detector which detects the difference between a positive charging current for charging the secondary battery and a reference current to generate a second detection signal;
a third detector which detects the difference between a charging voltage supplied to the secondary battery and a first reference voltage to generate a third detection signal;
a fourth detector which detects whether or not the input current exceeds a second reference value corresponding to the rated supply current to generate a fourth detection signal; and
a fifth detector which detects the difference between an output voltage of the DC-DC converter and a second reference voltage to generate a fifth detection signal,
wherein the control circuit controls the positive charging current for charging the secondary battery and a negative charging current supplied from the secondary battery to the load based on the first to fifth detection signals.

2. The DC-DC converter according to claim 1, wherein:
the input current is a synthesized current obtained by synthesizing a consumption current of the load with the positive charging current or the negative charging current; and
the control circuit supplies the load with the negative charging current from the secondary battery when the consumption current of the load exceeds the rated supply current and supplies the secondary battery with the positive charging current when the consumption current of the load is less than or equal to the rated supply current.

3. The DC-DC converter according to claim 1, further comprising:
a first transistor, connected to the control circuit, for receiving the input current;
a second transistor connected to the control circuit and connected in series to the first transistor; and
a choke coil, connected between the secondary battery and a node between the first and second transistors;
wherein the control circuit activates and inactivates each of the first and second transistors to supply the secondary battery with the positive charging current via the choke coil or supply the load with the negative charging current from the secondary battery via the choke coil.

4. The DC-DC converter according to claim 3, wherein the control circuit includes:

a first converter, connected to the first detector, the second detector, and the third detector, for generating a first pair of control signals each having a pulse width that is in accordance with one of the first detection signal, the second detection signal, and the third detection signal;
a second converter, connected to the fourth detector and the fifth detector, for generating a second pair of control signals each having a pulse width that is in accordance with one of the fourth detection signal and the fifth detection signal; and
a switching control circuit, connected to the first converter, the second converter, the first transistor, and the second transistor, for activating and inactivating the first and second transistors with either one of the first pair of control signals and the second pair of control signals in accordance with the consumption current of the load.

5. The DC-DC converter according to claim 4, wherein the switching control circuit includes:
a state detection circuit, connected to the first converter and the second converter, for detecting an operation state of the DC-DC converter based on the first pair of control signals and the second pair of control signals; and
a selection circuit, connected to the state detection circuit, the first transistor, and the second transistor, for selecting either one of the first pair of control signals and the second pair of control signals as a pair of switching control signals provided to the first and second transistors in accordance with the operation state detected by the state detection circuit.

6. The DC-DC converter according to claim 5, wherein the operation state of the DC-DC converter includes:
a first operation state in which the first pair of control signals is selected as the pair of switching control signals; and
a second operation state in which the second pair of control signals is selected as the pair of switching control signals;
wherein the selection circuit receives a charge enablement signal and cancels selection of the first pair of control signals in response to the charge enablement signal when the DC-DC converter is in the first operation state.

7. A control circuit for a DC-DC converter for use in an electronic device that receives an input current and includes a load that operates on the input current and a secondary battery, the control circuit comprising:
a first detector which detects whether or not the input current exceeds a first reference value corresponding to a rated supply current to generate a first detection signal;
a second detector which detects the difference between a positive charging current for charging the secondary battery and a reference current to generate a second detection signal;
a third detector which detects the difference between a charging voltage supplied to the secondary battery and a first reference voltage to generate a third detection signal;
a fourth detector which detects whether or not the input current exceeds a second reference value corresponding to the rated supply current to generate a fourth detection signal; and
a fifth detector which detects the difference between an output voltage of the DC-DC converter and a second reference voltage to generate a fifth detection signal,
wherein, based on the first to fifth detection signals, the control circuit controls the positive charging current for charging the secondary battery and a negative charging current supplied from the secondary battery to the load.

8. The control circuit according to claim 7, wherein:
the input current is a synthesized current obtained by synthesizing a consumption current of the load with the positive charging current or the negative charging current; and
the control circuit supplies the load with the negative charging current from the secondary battery when the consumption current of the load exceeds the rated supply current and supplies the secondary battery with the positive charging current when the consumption current of the load is less than or equal to rated supply current.

9. The control circuit according to claim 7, wherein the DC-DC converter includes:
a first transistor, connected to the control circuit, for receiving the input current;
a second transistor connected to the control circuit and connected in series to the first transistor; and
a choke coil, connected between the secondary battery and a node between the first and second transistors;
wherein the control circuit activates and inactivates each of the first and second transistors to supply the secondary battery with the positive charging current via the choke coil or supply the load with the negative charging current from the secondary battery via the choke coil.

10. The control circuit according to claim 9, further comprising:
a first converter, connected to the first detector, the second detector, and the third detector, for generating a first pair of control signals each having a pulse width that is in accordance with one of the first detection signal, the second detection signal, and the third detection signal;
a second converter, connected to the fourth detector and the fifth detector, for generating a second pair of control signals each having a pulse width that is in accordance with one of the fourth detection signal and the fifth detection signal; and
a switching control circuit, connected to the first converter, the second converter, the first transistor, and the second transistor, for activating and inactivating the first and second transistors with either one of the first pair of control signals and the second pair of control signals in accordance with the consumption current of the load.

11. The control circuit according to claim 10, wherein the switching control circuit includes:
a state detection circuit, connected to the first converter and the second converter, for detecting an operation state of the DC-DC converter based on the first pair of control signals and the second pair of control signals; and
a selection circuit, connected to the state detection circuit, the first transistor, and the second transistor, for selecting either one of the first pair of control signals and the second pair of control signals as a pair of switching control signals provided to the first and second transistors in accordance with the operation state detected by the state detection circuit.

12. The control circuit according to claim 11, wherein the operation state of the DC-DC converter includes:
a first operation state in which the first pair of control signals is selected as the pair of switching control signals; and
a second operation state in which the second pair of control signals is selected as the pair of switching control signals;
wherein the selection circuit receives a charge enablement signal and cancels selection of the first pair of control signals in response to the charge enablement signal when the DC-DC converter is in the first operation state.

13. An electronic device for receiving an input current, the electronic device comprising:
a DC-DC converter which generates a charging current from the input current;
a load that operates on the input current;
a secondary battery charged by the charging current, the DC-DC converter including:
a control circuit which includes:
a first detector which detects whether or not the input current exceeds a first reference value corresponding to a rated supply current to generate a first detection signal;
a second detector which detects the difference between a positive charging current for charging the secondary battery and a reference current to generate a second detection signal;
a third detector which detects the difference between a charging voltage supplied to the secondary battery and a first reference voltage to generate a third detection signal;
a fourth detector which detects whether or not the input current exceeds a second reference value corresponding to the rated supply current to generate a fourth detection signal; and
a fifth detector which detects the difference between an output voltage of the DC-DC converter and a second reference voltage to generate a fifth detection signal,
wherein based on the first to fifth detection signals, the control circuit controls the positive charging current for charging the secondary battery and a negative charging current supplied from the secondary battery to the load.

14. The electronic device according to claim 13, wherein:
the input current is a synthesized current obtained by synthesizing a consumption current of the load with the positive charging current or the negative charging current; and
the control circuit supplies the load with the negative charging current from the secondary battery when the consumption current of the load exceeds the rated supply current and supplies the secondary battery with the positive charging current when the consumption current of the load is less than or equal to the predetermined value rated supply current.

15. The electronic device according to claim 13, wherein the DC-DC converter includes:
a first transistor, connected to the control circuit, for receiving the input current;
a second transistor connected to the control circuit and connected in series to the first transistor; and
a choke coil, connected between the secondary battery and a node between the first and second transistors;
wherein the control circuit activates and inactivates each of the first and second transistors to supply the secondary battery with the positive charging current via the choke coil or supply the load with the negative charging current from the secondary battery via the choke coil.

16. The electronic device according to claim 15, wherein the control circuit includes:
a first converter, connected to the first detector, the second detector, and the third detector, for generating a first pair of control signals each having a pulse width that is in accordance with one of the first detection signal, the second detection signal, and the third detection signal;
a second converter, connected to the fourth detector and the fifth detector, for generating a second pair of control signals each having a pulse width that is in accordance with one of the fourth detection signal and the fifth detection signal; and a switching control circuit, connected to the first converter, the second converter, the first transistor, and the second transistor, for activating and inactivating the first and second transistors with either one of the first pair of control signals and the second pair of control signals in accordance with the consumption current of the load.

17. The electronic device according to claim 16, wherein the switching control circuit includes:

a state detection circuit, connected to the first converter and the second converter, for detecting an operation state of the DC-DC converter based on the first pair of control signals and the second pair of control signals; and a selection circuit, connected to the state detection circuit, the first transistor, and the second transistor, for selecting either one of the first pair of control signals and the second pair of control signals as a pair of switching control signals provided to the first and second transistors in accordance with the operation state detected by the state detection circuit.

18. The electronic device according to claim 17, wherein the operation state of the DC-DC converter includes:

a first operation state in which the first pair of control signals is selected as the pair of switching control signals; and a second operation state in which the second pair of control signals is selected as the pair of switching control signals;

wherein the selection circuit receives a charge enablement signal and cancels selection of the first pair of control signals in response to the charge enablement signal when the DC-DC converter is in the first operation state.

19. A method for controlling a DC-DC converter for use in an electronic device that receives an input current and includes a load that operates on the input current and a secondary battery, the method comprising:

detecting whether or not the input current exceeds a first reference value corresponding to a rated supply current to generate a first detection signal;

detecting the difference between a positive charging current for charging the secondary battery and a reference current to generate a second detection signal;

detecting the difference between a charging voltage supplied to the secondary battery and a first reference voltage to generate a third detection signal;

detecting whether or not the input current exceeds a second reference value corresponding to the rated supply current to generate a fourth detection signal;

detecting the difference between an output voltage of the DC-DC converter and a second reference voltage to generate a fifth detection signal; and controlling, based on the first to fifth detection signals, the positive charging current for charging the secondary battery and a negative charging current supplied from the secondary battery to the load.

20. The method according to claim 19, wherein:

the input current is a synthesized current obtained by synthesizing a consumption current of the load with the positive charging current or the negative charging current; and said controlling includes supplying the load with the negative charging current from the secondary battery when the consumption current of the load exceeds the rated supply current and supplying the secondary battery with the positive charging current when the consumption current of the load is less than or equal to the rated supply current.

21. The method according to claim 19, wherein:

the DC-DC converter includes:

a first transistor, connected to the control circuit, for receiving the input current;

a second transistor connected to the control circuit and connected in series to the first transistor; and a choke coil, connected between the secondary battery and a node between the first and second transistors; and said controlling includes:

activating and inactivating each of the first and second transistors to supply the secondary battery with the positive charging current via the choke coil; and activating and inactivating each of the first and second transistors to supply the load with the negative charging current from the secondary battery via the choke coil.

22. The method according to claim 21, wherein said controlling includes:

generating a first pair of control signals each having a pulse width that is in accordance with one of the first detection signal, the second detection signal, and the third detection signal;

generating a second pair of control signals each having a pulse width that is in accordance with one of the fourth detection signal and the fifth detection signal; and activating and inactivating the first and second transistors with either one of the first pair of control signals and the second pair of control signals in accordance with the consumption current of the load.

23. The method according to claim 22, wherein said activating and inactivating the first and second transistors includes:

detecting an operation state of the DC-DC converter based on the first pair of control signals and the second pair of control signals; and selecting either one of the first pair of control signals and the second pair of control signals as a pair of switching control signals provided to the first and second transistors in accordance with the operation state detected by the state detection circuit.

24. The method according to claim 23, wherein the operation state of the DC-DC converter includes:

a first operation state in which the first pair of control signals is selected as the pair of switching control signals; and a second operation state in which the second pair of control signals is selected as the pair of switching control signals;

wherein the DC-DC converter receives a charge enablement signal, and said selecting includes canceling selection of the first pair of control signals in response to the charge enablement signal when the DC-DC converter is in the first operation state.

25. A DC-DC converter for installation in an electronic device, the electronic device including a load that operates on an input current, the DC-DC converter that generates a charging current for charging a secondary battery in accordance with the input current comprising:

an input current detector which detects the input current;

a first detector which outputs a first difference value between the detection result of the input current and a first reference value corresponding to a rated supply current;

a first control unit which controls a positive charging current for charging the secondary battery in accordance with the first difference value;

a second detector which outputs a second difference value between the detection result of the input current and a second reference value corresponding to the rated supply current; and a second control unit which controls a negative charging current supplied from the secondary battery to the load in accordance with the second difference value.

26. The DC-DC converter according to claim 25, wherein:
the first control unit generates a first pair of control signals; and the second control unit generates a second pair of control signals, the DC-DC converter further comprising a control signal selector which selects either one of the first pair of control signals and second pair of control signals depending on the first pair of control signals and second pair of control signals.

* * * * *